United States Patent [19]
Adamson et al.

[11] Patent Number: 5,896,892
[45] Date of Patent: Apr. 27, 1999

[54] CONDUIT CAP AND SPACER SYSTEM

[76] Inventors: Bret Adamson, 3924 W. 3000 North, Benson, Utah 84335; Devin Thomas, 1000 N. 278, W. Logan, Utah 84321; Brian Haslam, 1017 E. 30, S. Hyrum, Utah 84319

[21] Appl. No.: 08/985,410

[22] Filed: Dec. 4, 1997

[51] Int. Cl.⁶ .................................................. F16L 55/115
[52] U.S. Cl. .................................. 138/89; 138/96 R
[58] Field of Search ............... 138/89, 89.4, 91, 138/96 R

[56] References Cited

U.S. PATENT DOCUMENTS

| | | | |
|---|---|---|---|
| 378,878 | 3/1888 | Eunson | 138/89 |
| 2,363,592 | 11/1944 | Hunter | 138/89 |
| 2,628,384 | 2/1953 | Shomber | 138/89 |
| 2,632,198 | 3/1953 | Becker | 138/89 |
| 2,709,830 | 6/1955 | Becker | 138/89 |
| 3,160,175 | 12/1964 | Laemmle | 138/96 R |
| 3,350,044 | 10/1967 | Zulauf | 138/96 R |
| 4,060,100 | 11/1977 | Miller et al. | 138/89 |
| 4,417,890 | 11/1983 | Dennehey et al. | 138/89 |

*Primary Examiner*—Denise L. Ferensic
*Assistant Examiner*—James F. Hook

[57] ABSTRACT

A conduit covering system is provided including a cover having a pair of planar faces and a periphery formed therebetween. The periphery has a pair of circular portions with a pair of intermediate portions formed therebetween. The cover further includes a pair of cap side walls each having a hollow cylindrical configuration. Each cap side wall is integrally coupled to the corresponding circular portion of the periphery and extends therefrom to define a circular opening. As such, the circular openings of the cover are adapted to releasably receive ends of a pair of conduits.

8 Claims, 2 Drawing Sheets

CONDUIT CAP AND SPACER SYSTEM

BACKGROUND OF THE INVENTION

1. Field of the Invention

The present invention relates to conduit spacers and more particularly pertains to a new conduit cap and spacer system for both preventing debris from entering a pair of conduits and further maintaining the same in a spaced parallel relationship.

2. Description of the Prior Art

The use of conduit spacers is known in the prior art. More specifically, conduit spacers heretofore devised and utilized are known to consist basically of familiar, expected and obvious structural configurations, notwithstanding the myriad of designs encompassed by the crowded prior art which have been developed for the fulfillment of countless objectives and requirements.

Known prior art conduit spacers include U.S. Pat. No. 4,467,988; U.S. Pat. No. 5,115,542; U.S. Pat. Des. 365,052; U.S. Pat. No. 4,244,542; U.S. Pat. No. 4,114,241; and U.S. Pat. No. 5,316,245.

In these respects, the conduit cap and spacer system according to the present invention substantially departs from the conventional concepts and designs of the prior art, and in so doing provides an apparatus primarily developed for the purpose of both preventing debris from entering a pair of conduits and further maintaining the same in a spaced parallel relationship.

SUMMARY OF THE INVENTION

In view of the foregoing disadvantages inherent in the known types of conduit spacers now present in the prior art, the present invention provides a new conduit cap and spacer system construction wherein the same can be utilized for both preventing debris from entering a pair of conduits and further maintaining the same in a spaced parallel relationship.

The general purpose of the present invention, which will be described subsequently in greater detail, is to provide a new conduit cap and spacer system apparatus and method which has many of the advantages of the conduit spacers mentioned heretofore and many novel features that result in a new conduit cap and spacer system which is not anticipated, rendered obvious, suggested, or even implied by any of the prior art conduit spacers, either alone or in any combination thereof.

To attain this, the present invention generally comprises a cover having a planar pair of faces and a periphery formed therebetween. As shown in FIGS. 1 & 2, the periphery has a generally peanut-shaped configuration with a pair of circular portions. A pair of inwardly tapering symmetric portions are formed between the circular portions each with a radius of curvature equal to that of the circular portions. The cover further includes a pair of cap side walls each having a hollow cylindrical configuration. Each cap side wall is integrally coupled to the corresponding circular portion of the periphery and extends therefrom to define a circular opening. The cover further has a pair of tapering side walls each integrally coupled to the inwardly tapering symmetric portions of the periphery between the circular portions. As such, a hollow reinforced interconnect region is defined. By this structure, the circular openings of the cover are adapted to releasably receive ends of a pair of conduits. Next provided is a resilient spacer having a pair of interconnecting side walls each having a hollow cylindrical configuration. A cut out is formed in each of the interconnecting side walls. A pair of inwardly tapering side walls are each integrally coupled between the interconnecting side walls to define a hollow reinforced interconnect region. By the interconnection of the interconnecting side walls, the cut outs face a similar direction and the interconnecting side walls are situated about spaced parallel axes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new conduit cap and spacer system apparatus and method which has many of the advantages of the conduit spacers mentioned heretofore and many novel features that result in a new conduit cap and spacer system which is not anticipated, rendered obvious, suggested, or even implied by any of the prior art conduit spacers, either alone or in any combination thereof.

It is another object of the present invention to provide a new conduit cap and spacer system which may be easily and efficiently manufactured and marketed.

It is a further object of the present invention to provide a new conduit cap and spacer system which is of a durable and reliable construction.

An even further object of the present invention is to provide a new conduit cap and spacer system which is susceptible of a low cost of manufacture with regard to both materials and labor, and which accordingly is then susceptible of low prices of sale to the consuming public, thereby making such conduit cap and spacer system economically available to the buying public.

Still yet another object of the present invention is to provide a new conduit cap and spacer system which provides in the apparatuses and methods of the prior art some of the advantages thereof, while simultaneously overcoming some of the disadvantages normally associated therewith.

Still another object of the present invention is to provide a new conduit cap and spacer system for both preventing debris from entering a pair of conduits and further maintaining the same in a spaced parallel relationship.

Even still another object of the present invention is to provide a new conduit cap and spacer system that includes a cover having a pair of planar faces and a periphery formed therebetween. The periphery has a pair of circular portions with a pair of intermediate portions formed therebetween. The cover further includes a pair of cap side walls each having a hollow cylindrical configuration. Each cap side wall is integrally coupled to the corresponding circular portion of the periphery and extends therefrom to define a circular opening. As such, the circular openings of the cover are adapted to releasably receive ends of a pair of conduits.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
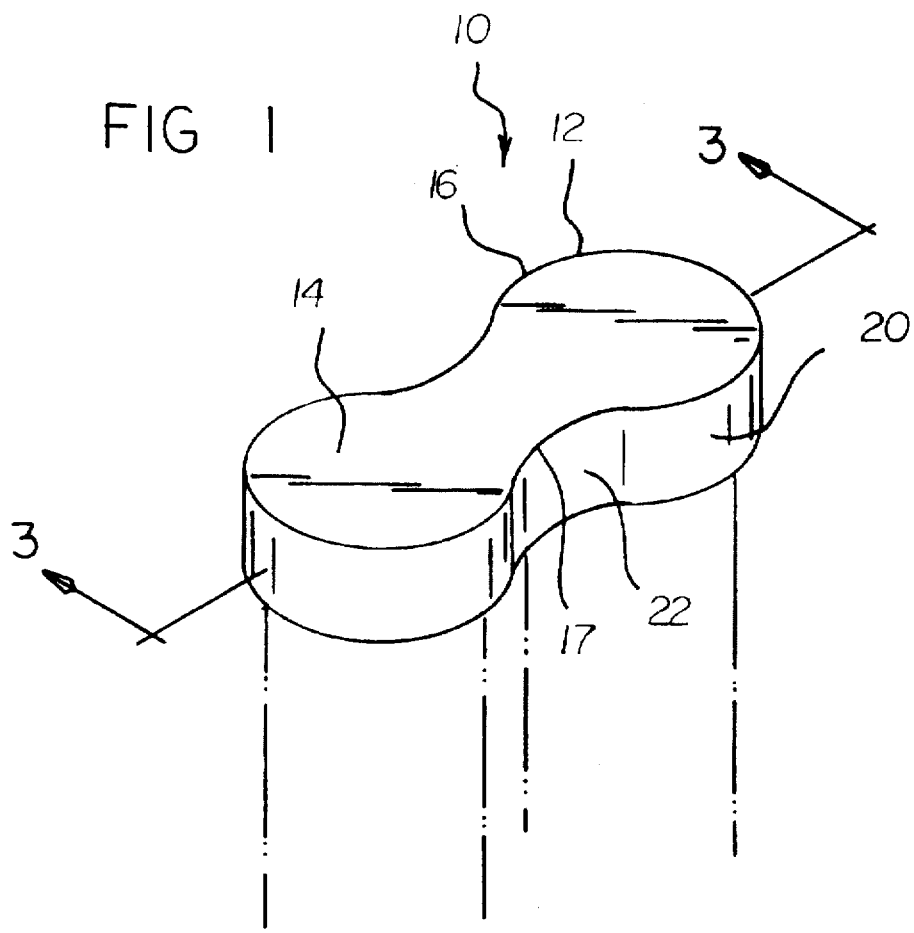
FIG. 1 is a perspective view of a new conduit cap according to the present invention.

With reference now to the drawings, and in particular to FIGS. 1 through 4 thereof, a new conduit cap and spacer system embodying the principles and concepts of the present invention and generally designated by the reference numeral 10 will be described.

Figure 2:
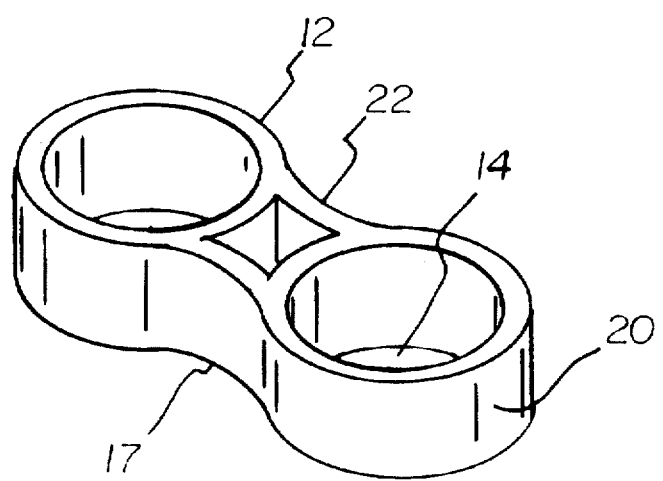
FIG. 2 is another perspective view of the cap of the present invention.
Figure 3:
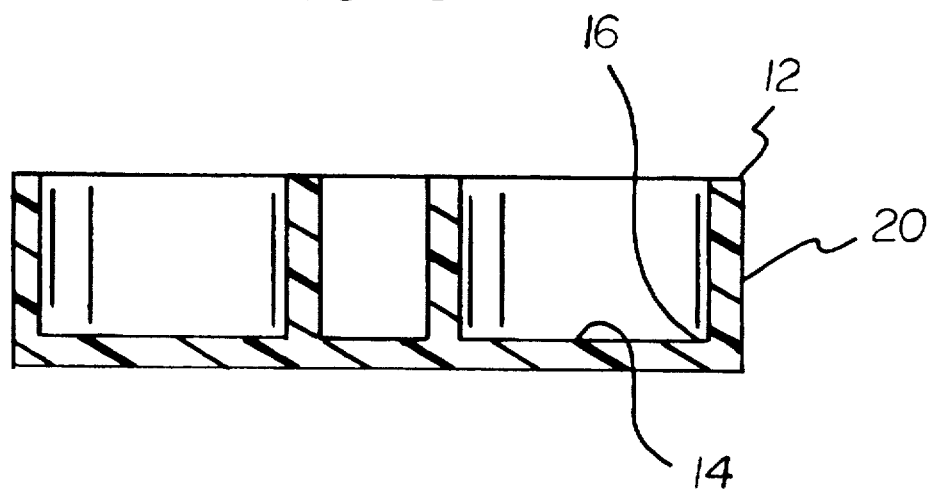
FIG. 3 is a cross-sectional view of the present invention taken along line 3—3 shown in FIG. 1.
Figure 4:
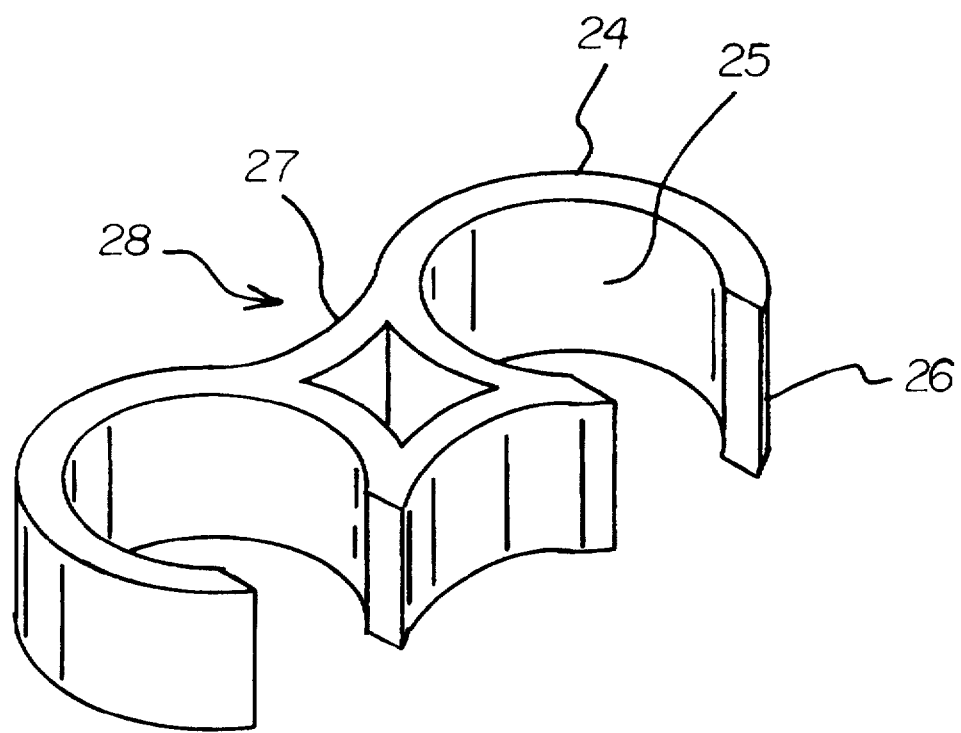
FIG. 4 is a perspective view of the spacer of the present invention.

The present invention, as designated as numeral 10, includes a cover 12 having a pair of planar faces 14 and a periphery 16 formed therebetween. As shown in FIGS. 1 & 2, the periphery has a generally peanut-shaped configuration with a pair of circular portions. Each of the circular portions are identical in size. A pair of inwardly tapering symmetric portions 17 are formed between the circular portions each with a radius of curvature equal to that of each circular portion.

The cover further includes a pair of cap side walls 20 each having a hollow cylindrical configuration. Each cap side wall is integrally coupled to the corresponding circular portion of the periphery and extends therefrom to define a circular opening. In the preferred embodiment, an inner surface of each of the cap side walls tapers inwardly such that a frusto-conical configuration in defined for reasons that will soon become apparent.

The cover further has a pair of tapering side walls 22 each integrally coupled to the inwardly tapering symmetric portions of the periphery between the circular portions. As such, a hollow reinforced interconnect region is defined. Preferably, the tapering side walls and cap side walls each having a common depth. By this structure, the circular openings of the cover are adapted to releasably receive ends of a pair of conduits. This is imperative during construction during which debris is liable to enter the conduits. It should be noted that the caps further protect the threads of the conduits.

Next provided is a resilient spacer 24 having a pair of similarly sized interconnecting side walls 25 each with a hollow cylindrical configuration. A cut out 26 is formed in each of the interconnecting side walls. Each cut out ideally defines about ¼–⅙ of the periphery of the interconnecting side walls. A pair of inwardly tapering side walls 27 are each integrally coupled between the interconnecting side walls to define a hollow reinforced interconnect region 28. By the interconnection of the interconnecting side walls, the cut outs face a similar direction and the interconnecting side walls are situated about spaced parallel axes.

During use, the interconnecting side walls are adapted to be releasably coupled with an intermediate extent of the pair of conduits for interconnecting the conduits and further maintaining the same in a spaced parallel relationship. Ideally, such spaced relationship is sufficient to accommodate a 4×4 inch electrical box.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A conduit spacer and covering system comprising, in combination:

a cover having a pair of planar faces and a periphery formed therebetween, the periphery having a generally peanut-shaped configuration with a pair of circular portions with a pair of inwardly tapering symmetric portions formed therebetween with a radius of curvature equal to that of the circular portions, the cover further including a pair of cap side walls each having a hollow cylindrical configuration and each integrally coupled to the corresponding circular portion of the periphery and extending therefrom to define a circular opening, the cover further including a pair of tapering side walls each integrally coupled to the inwardly tapering symmetric portions of the periphery between the circular portions to define a hollow reinforced interconnect region, wherein the tapering side walls and the cap side walls each have a common depth, whereby the circular openings of the cover are adapted to releasably receive ends of a pair of conduits; and a resilient spacer having a pair of interconnecting side walls each having a hollow cylindrical configuration with a cut out formed therein, wherein the cut outs each define about ⅙–¼ of the periphery of the corresponding interconnecting side wall, the resilient spacer further having a pair of inwardly tapering side walls each integrally coupled between the interconnecting side walls to define a hollow reinforced interconnect region that is positioned about an axis parallel with the interconnecting side walls such that the cut outs face a similar direction and the interconnecting side walls are situated about spaced parallel axes, whereby the interconnecting side walls are adapted to be releasably coupled with an intermediate extent of the pair of conduits for maintaining the same in a spaced parallel relationship.

2. A conduit covering system comprising a cover having a pair of faces and a periphery formed therebetween, the periphery having a pair of circular portions with a pair of intermediate portions formed therebetween, the cover further including a pair of cap side walls each having a hollow cylindrical configuration and each integrally coupled to the corresponding circular portion of the periphery and extending therefrom to define a circular opening, whereby the circular openings of the cover are adapted to releasably receive ends of a pair of conduits, the system further including a resilient spacer for interconnecting the conduits and maintaining the same in a spaced parallel relationship, wherein the spacer has a pair of interconnecting side walls each having a hollow cylindrical configuration with a cut out formed therein and a pair of inwardly tapering side walls each integrally coupled between the interconnecting side walls to define a hollow reinforced interconnect region that is positioned about an axis parallel with the interconnecting side walls such that the cut outs face a similar direction and the interconnecting side walls are situated about spaced parallel axes.

3. A conduit covering system as set forth in claim 2 wherein the periphery of the cover has a generally peanut-shaped configuration.

4. A conduit covering system as set forth in claim 2 wherein an intermediate reinforcement portion is formed between the cap side walls.

5. A conduit covering system as set forth in claim 4 wherein the intermediate reinforcement portion of the cover includes a pair of inwardly tapering walls each with a radius of curvature equal to that of each circular portion of the periphery.

6. A conduit covering system as set forth in claim 2 wherein the cut outs each define about ⅙–¼ of the periphery of the corresponding interconnecting side wall.

7. A resilient spacer for interconnecting the conduits and maintaining the same in a spaced parallel relationship, the spacer comprising a pair of interconnecting side walls each having a hollow cylindrical configuration with a cut out formed therein and a pair of inwardly tapering side walls each integrally coupled between the interconnecting side walls to define a hollow reinforced interconnect region that is positioned about an axis parallel with the interconnecting side walls such that the cut outs face a similar direction and the interconnecting side walls are situated about spaced parallel axes.

8. A conduit covering system as set forth in claim 7 wherein the cut outs each define about ⅙–¼ of the periphery of the corresponding interconnecting side wall.

* * * * *